No. 882,469. PATENTED MAR. 17, 1908.
J. H. JACKSON.
BALING PRESS ATTACHMENT.
APPLICATION FILED FEB. 20, 1907. RENEWED OCT. 22, 1907.
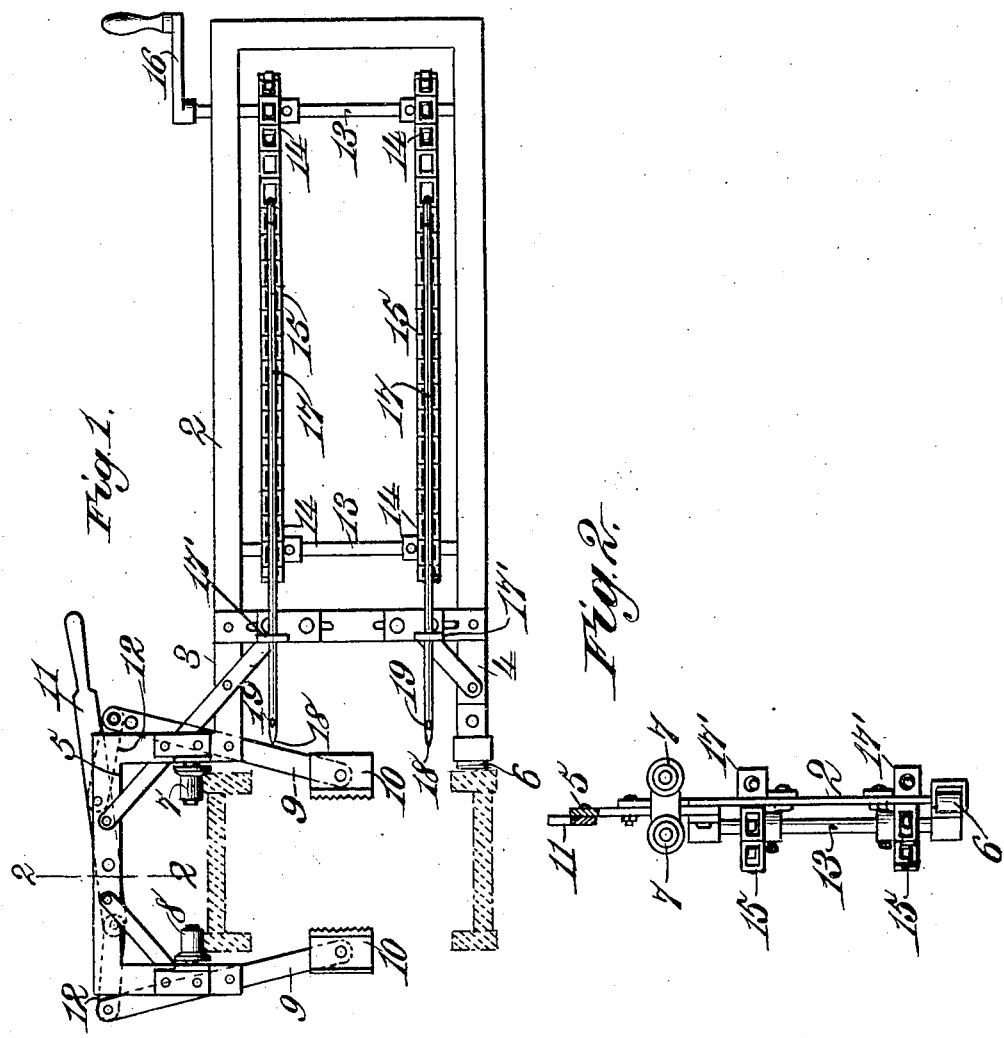

UNITED STATES PATENT OFFICE.

JAMES H. JACKSON, OF DENISON, TEXAS.

BALING-PRESS ATTACHMENT.

No. 882,469.   Specification of Letters Patent.   Patented March 17, 1908.

Application filed February 20, 1907, Serial No. 358,384. Renewed October 22, 1907. Serial No. 398,615.

*To all whom it may concern:*

Be it known that I, JAMES H. JACKSON, a citizen of the United States, residing at Denison, in the county of Grayson and State of Texas, have invented new and useful Improvements in Baling-Press Attachments, of which the following is a specification.

This invention relates to a baling press attachment, the object of the invention being to provide an effective apparatus of this character which can be readily and quickly applied to a press and by the use of which the wire or wires or other tying means for a bale can be passed through such a bale with facility and accuracy.

The device has means for clamping it in position so that it can be firmly held during the act of passing a wire or wires through the material in the press whether such material be hay, straw, cotton, or other substance.

The clamping means may be disengaged readily from the bale or compressed material and the article can be bodily moved along the bale box or chamber and with the minimum amount of friction.

In the drawings accompanying and forming a part of this specification, 1 represents in detail one form of embodiment of the invention, which to enable those skilled in the art to practice said invention, will be fully set forth in the following description, while the novelty of said invention will be included in the claims succeeding said description.

Referring to said drawings, Figure 1 is a side elevation of an attachment including my invention. Fig. 2 is a cross sectional view, the section being taken on the line 2—2 of Fig. 1.

Like characters indicate like parts throughout the views.

The attachment includes in its make-up a body portion which may be of any desirable kind, for example, such as a frame 2 which for lightness is made in open form and which in practice may be braced or otherwise strengthened to any desirable extent. The upper and lower members of this frame 2 are illustrated as extending inward as at 3 and 4, the upper extension 3 rigidly carrying a yoke as 5 adapted to straddle the upper portion of the bale box, or that part of the press in which the bale or bales are formed. The attachment as will hereinafter appear is bodily movable longitudinally of said baling box or chamber, so that the needles can be passed through the material in said box at different points in the length thereof.

The lower extension 4 is represented as equipped with an anti-friction roller as 6, the bracket of which is adjustably connected with said extension and the roller has a movement about a vertical axis, from which it will be understood that said anti-friction roller is adapted to traverse one of the side faces of said baling box. One of the vertical or side members of the yoke 5 is equipped with similar anti-friction rollers, each designated by 7, two of such rollers being shown, the brackets thereof being attached to the said yoke in any desirable way, for example, adjustably. The other side member of this yoke is represented as equipped with one anti-friction roller 8, the bracket of which is preferably adjustably connected with said yoke. The adjustment of the several rollers 7 and 8 is in a vertical direction, so as to adapt the attachment to baling boxes of different heights, and these several rollers 7 and 8 rotate in the present case about horizontal axes from which it will be obvious that they are adapted to move along the upper surface of said baling box.

From what has been hereinbefore stated it will be apparent that the attachment has clamping means and such clamping means preferably engage the bale of compressed or partly compressed mass of material in the baling box, and the same is represented in the drawings as involving two similar levers as 9 fulcrumed substantially midway between their ends upon the yoke 5 and near the lower ends of the two side members thereof. These levers have suitably fastened thereto jaws as at 10, the working faces of which are roughened to obtain an effective hold upon the bale. A third lever is shown at 11 and as fulcrumed between its ends substantially centrally of the cross bar of the yoke 5. I have represented as jointed to this lever 11 at opposite sides of its center of motion duplicate links as 12, said links being similarly united with the upper ends of the clamping levers 9. At its free end the actuating lever 11 is provided with a handle to insure its ready manipulation. When this handle is lifted by the operator the two jaws 10, through the intermdiate connections with the lever 11, are separated to disengage the same from a bale of material, while when the handle is lowered the opposite result takes place, that is, the jaws 10 are caused to grip the bale. The two links 12 and lever 11 are so related as to present a double locking toggle by virtue of which when the lever 11 is down or when it occupies substantially horizontal position, such lever cannot be accidentally swung upward to release the attachment from the bale. When the jaws, however, are disengaged from the bale by the operation of the lever 11 the attachment can be freely moved longitudinally of the baling box, and during this time the anti-friction rollers 6, 7 and 8 will move along the exterior surface of the baling box or chamber.

The means represented in the drawings for passing a wire or a plurality of wires through the bale includes in its construction two shafts as 13, each of which is illustrated as provided with a pair of wheels as 14 arranged in coöperative pairs and around which coöperative wheels, bands as 15 pass. I have shown two bands for the reason that in the form of the device illustrated two needles are provided. This, however, is not essential. The bands and wheels are ordinarily made of sprocket form as this is a construction which prevents slippage of the bands. The wheels are adjustable longitudinally of their respective shafts so as to adapt the device to bales of different sizes. One of the shafts 13, the outer one in the present case, is preferably provided with some suitable means for manually operating the same. The means shown for this purpose is a hand crank 16 and when this hand crank is operated the two shafts 13, several wheels 14 and endless bands 15 will be simultaneously operated so as to cause the projection through or the withdrawal from a bale, of needles as 17, which needles are suitably flexibly connected with the respective bands or chains 15. It will be apparent that when the hand crank 16 is turned in one direction the needles 17 by virtue of their connection with the bands 15 can be moved through the bale and on the opposite movement of said hand crank a return movement can be imparted to the two needles through the intermediate parts. The two needles consist preferably of elongated shanks pointed at their extreme forward ends as at 18 to insure their ready penetration of the bale. Near the pointed ends 18 of the needles I may provide perforations as 19 through which the wires which are utilized in tying the bale can be passed. The parallel needles 17, whether there be two or more travel simultaneously through the bale, are threaded from one side of the bale and are then driven through said bale until their pointed and eye ends reach the opposite side of said bale, when the needles can be unthreaded, following which the needles can be drawn backward unthreaded until they emerge from the opposite side of the bale ready for threading or to permit the movement bodily of the attachment along the baling box. The two needles 17 travel through guides as 17' adjustably supported on the body member or frame 2, and which guides insure proper longitudinal movement of the needles into and out of the bale.

In use I employ the familiar hay ties and these I prefer to connect with the needles 17 upon the side next to the feeder of the baling press. It will be understood that I do not show such a feeder in the drawings as the same forms no part of the invention. These wire ties can be run through the hay or other material from either side of the bale box.

In Fig. 1 the wires are passed through the material from that side of said box on the right in said figure. Initially I connect two wires with the needles 17 and then project said needles through the hay or other material in the baling box. I then unthread these first two wires from said needles, following which the two wires are pulled through the material to about two-thirds of their length. The needles are then drawn backward through the bale and the attachment is moved longitudinally of the baling press a distance that is to define the length of the bale. I then thread the needles now occupying their position shown in Fig. 1 with a second pair of wires and force the needles with said second two wires through the material, after which the second wires are unthreaded from the needles and wires number one are connected therewith. I then thread the leading ends of wires number one into said needles and draw them back through the material carrying therewith the said wires number one, and when said needles have emerged from the bale on the right side of the baling box shown in Fig. 1 it will be understood that the opposite ends of the two wires number one are both on said side of the box. These ends are then grasped by the attendant who takes up the slack in the wires and then ties said ends together. The same operation is then repeated with bale number two and so on.

What I claim is:

1. In an attachment of the class described, a bodily movable frame, clamping means connected with said frame, a needle operatively associated with the frame, and means for actuating the needle to move the same through a bale.

2. In an attachment of the class described, a bodily movable frame having anti-friction rollers adapted to travel against the exterior surface of the baling box of a baling press, clamping means for fixing the frame in position, a needle operatively associated with said frame, and means for actuating the needle to drive the same through a bale in said box.

3. In an attachment of the class described, a frame, a pair of coöperative wheels, an endless band passing around said wheels, and a needle connected with said band.

4. In an attachment of the class described, a frame, clamping means associated with the frame, a plurality of shafts supported by the frame, rotary sprocket wheels carried by the shafts, sprocket chains passing around the respective sprocket wheels, and needles connected with the respective chains.

5. In an attachment of the class described, a frame, a yoke carried by said frame, levers supported by the yoke and provided with jaws, means for operating the levers to move the jaws toward and from each other, a band carried by the frame, and a needle connected with said band.

6. In an attachment of the class described, a frame, a plurality of shafts rotatively supported by said frame, one of the shafts having means for turning the same, sprocket wheels rotative with the shafts, sprocket chains connecting the respective sprocket wheels, needles connected with the sprocket chain, and clamping means for fixedly mounting said frame in place and suitably associated therewith.

7. In an attachment of the class described, a frame, a pair of levers operatively associated with said frame, jaws carried by the levers, means for operating the levers to move the jaws toward and from each other, a band operatively supported by said frame, and a needle connected with the band.

8. In an attachment of the class described, a frame, a pair of levers operatively associated with said frame, jaws carried by the levers, a third lever also operatively associated with said frame, links connecting the third lever with the other levers, and presenting with the latter a double toggle, said third lever when operated serving to actuate the first-mentioned levers to move the jaws toward and from each other, a band operatively associated with said frame, and a needle connected with said band.

In testimony whereof I have hereunto set my hand in presence of two subscribing witnesses.

JAMES H. JACKSON.

Witnesses:
J. R. ALLEN,
WM. U. BRIDAUGH.